Figure 2:
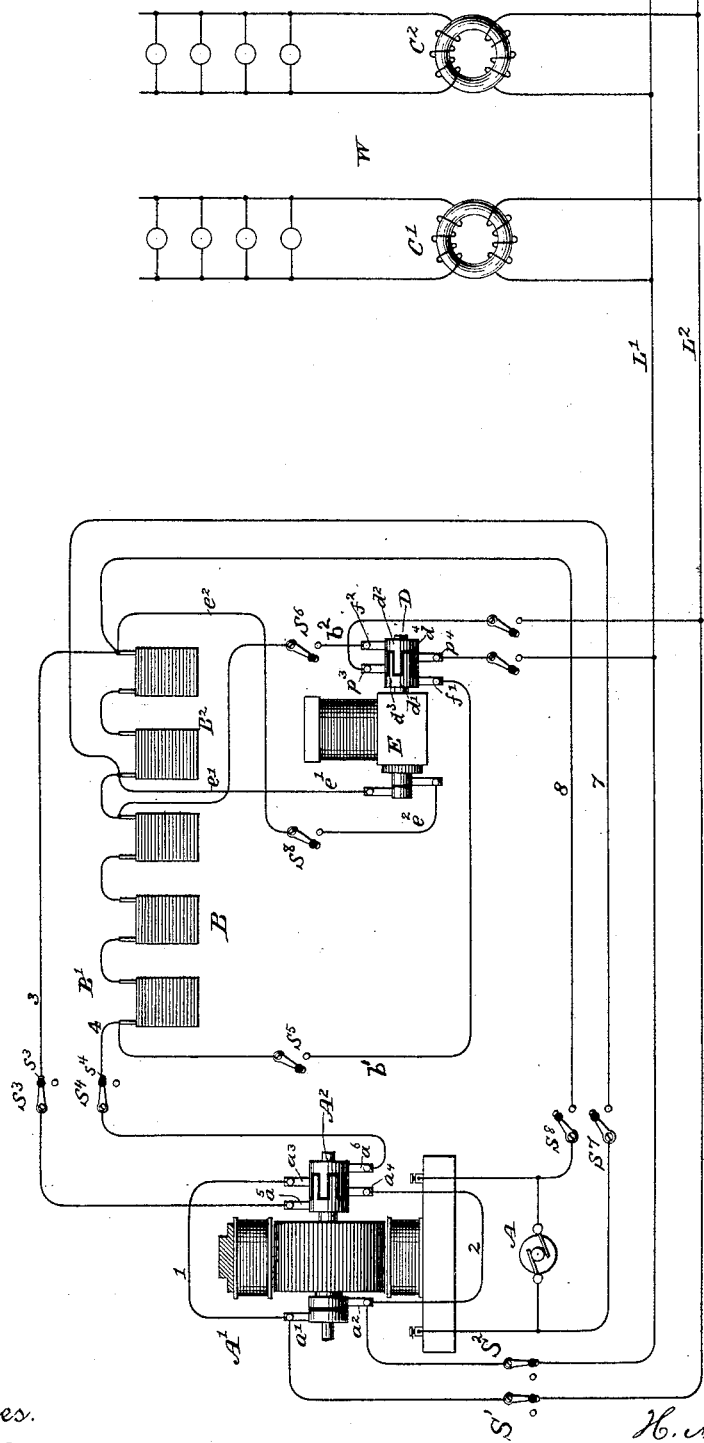

(No Model.) 3 Sheets—Sheet 1.
H. M. BYLLESBY.
COMBINED ALTERNATE CURRENT AND STORAGE SYSTEM OF ELECTRICAL DISTRIBUTION.
No. 383,620. Patented May 29, 1888.
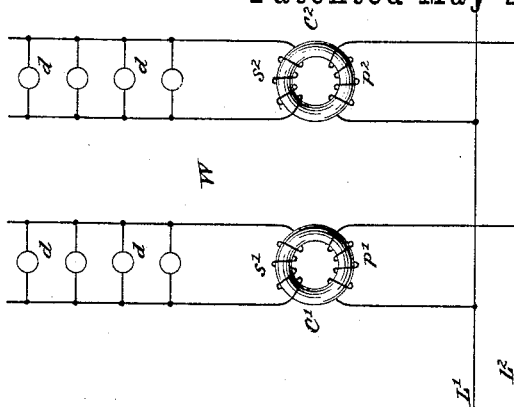
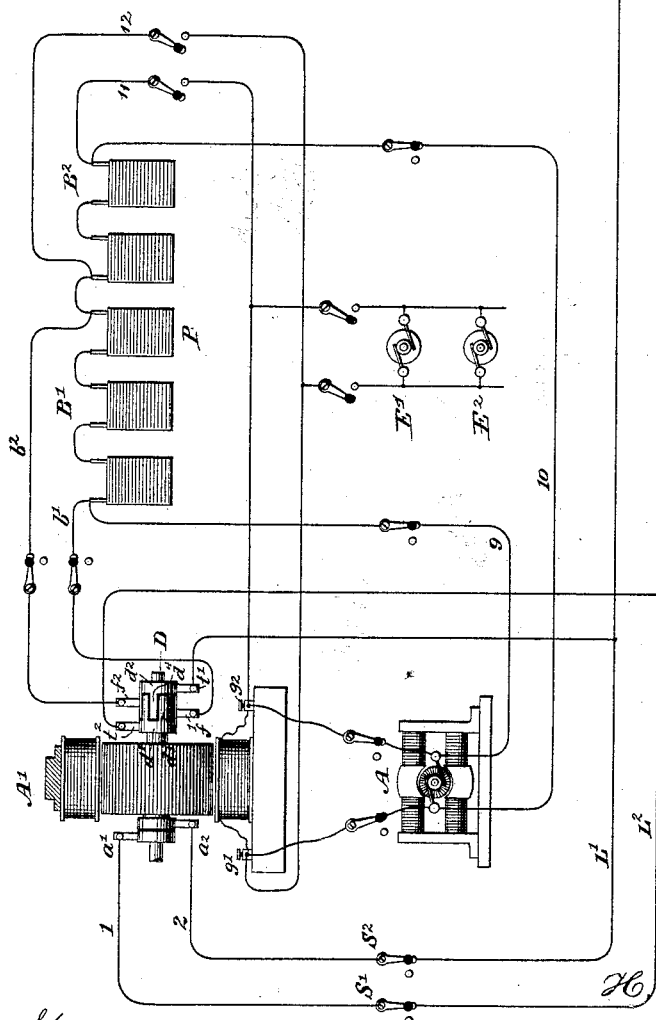
Witnesses,
Geo. W. Breck.
Carrie E. Ashley.
Inventor,
H. M. Byllesby.
By his Attorneys,
Pope Edgecomb & Ferry.

(No Model.) 3 Sheets—Sheet 2.

H. M. BYLLESBY.
COMBINED ALTERNATE CURRENT AND STORAGE SYSTEM OF ELECTRICAL DISTRIBUTION.

No. 383,620. Patented May 29, 1888.

Witnesses.
Geo. W. Breck.
Carrie E. Ashley.

Inventor.
H. M. Byllesby.
By his Attorneys
Pope Edgcomb & Terry.

(No Model.) 3 Sheets—Sheet 3.
H. M. BYLLESBY.
COMBINED ALTERNATE CURRENT AND STORAGE SYSTEM OF ELECTRICAL DISTRIBUTION.
No. 383,620. Patented May 29, 1888.
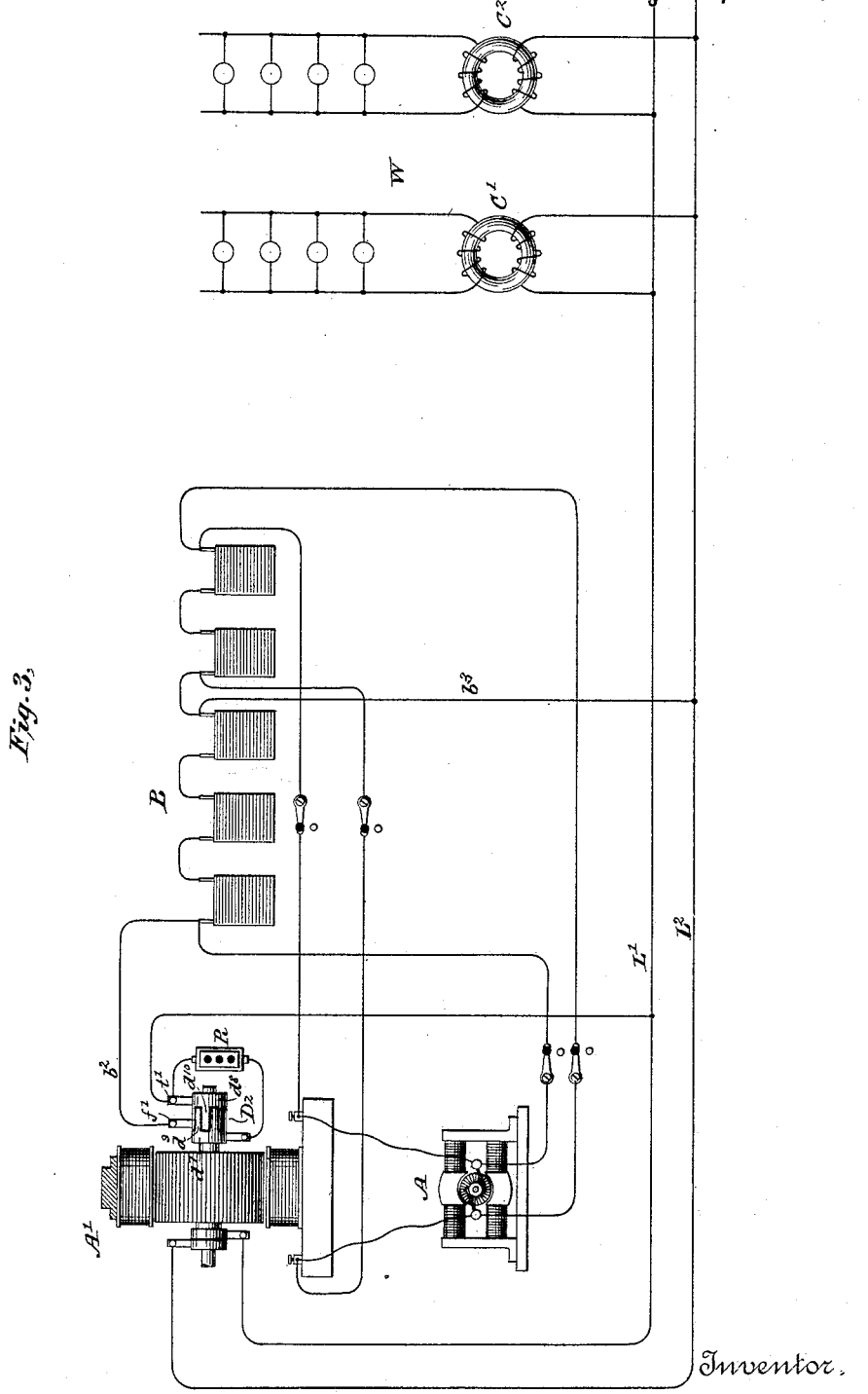
Witnesses.
Geo. W. Breck.
Carrie E. Ashley.
Inventor,
H. M. Byllesby.
By his Attorneys.
Pope Edgecomb & Terry.

UNITED STATES PATENT OFFICE.

HENRY M. BYLLESBY, OF PITTSBURG, PENNSYLVANIA, ASSIGNOR TO THE WESTINGHOUSE ELECTRIC COMPANY, OF SAME PLACE.

COMBINED ALTERNATE-CURRENT AND STORAGE SYSTEM OF ELECTRICAL DISTRIBUTION.

SPECIFICATION forming part of Letters Patent No. 383,620, dated May 29, 1888.

Application filed October 1, 1887. Serial No. 251,198. (No model.)

*To all whom it may concern:*

Be it known that I, HENRY M. BYLLESBY, a citizen of the United States, residing in Pittsburg, in the county of Allegheny and State of Pennsylvania, have invented certain new and useful Improvements in a Combined Alternate-Current and Storage-Battery System of Electrical Distribution, of which the following is a specification.

The invention relates to an organization of circuits and apparatus whereby currents from a storage-battery may be advantageously employed in connection with a system of alternate-current electric distribution.

The object of the invention is to provide convenient and efficient means whereby currents from an alternate-current electric generator may be employed for charging a storage-battery, and to utilize the currents from the battery for operating the translating devices connected with an alternate-current system of distribution, and at the same time other apparatus operated by direct or continuous currents.

The invention consists in employing, in connection with an alternate-current electric generator employed for operating a system of electric distribution by secondary currents and a storage-battery, apparatus for delivering rectified currents to the battery; and it also consists in employing the currents from the battery either as direct electric currents for operating electric motors or other desired apparatus, or, if desired, in the form of alternating, intermittent, or pulsatory currents for operating the translating devices.

Certain other organizations of storage-batteries with systems of electrical distribution are described and claimed in other applications filed by me, Serial Nos. 251,199 and 251,200, of even date herewith, and Serial No. 265,265, filed February 25, 1888.

In the accompanying drawings there is illustrated, in Figure 1, a general organization of circuits and apparatus for carrying out the invention. Figs. 2 and 3 illustrate modifications.

Referring to the figures, A' represents a source of alternating electric currents. A direct-current machine, A, has its respective poles connected with the binding-poles $g'$ and $g^2$, with which the terminals of the field-magnet coils of the generator A' are connected. The respective collecting-brushes $a'$ and $a^2$ of this source are connected by conductors 1 and 2 with switches S' and S$^2$, and thus with conductors L' and L$^2$. The lines L' and L$^2$ are designed to supply currents to a work-circuit, W, operated by alternating electric currents. The work-circuit W is connected with the conductors L' and L$^2$ through converters C' and C$^2$. The primary coils $p'$ $p^2$ of the converters are connected in multiple arc with the conductors L' and L$^2$, and the secondary coils $s'$ and $s^2$ are connected with the translating devices $d\ d$, which latter are arranged in multiple arc in their respective circuits. It sometimes chances that in a system of distribution of this character it is desired to employ more current than the generator A' is capable of furnishing. For this purpose a reserve may be supplied and drawn upon as required by the employment of a storage-battery, B. This battery is designed to be charged in this instance from the direct-current machine or exciter A when necessary, and currents therefrom may be employed also for operating direct-current devices, such as electric motors E' and E$^2$, &c.

If the battery is to be charged from the exciter or direct-current machine, conductors 9 and 10 are led therefrom to the respective poles of the storage-battery B. When the battery is to be discharged, the current from a portion of the whole may be rendered alternating by a rheotome, D, upon the shaft of the generator. For this purpose conductors $b'$ and $b^2$ lead from the terminals of a portion, B', of the battery to brushes $f'$ and $f^2$ of the rheotome. These brushes make alternate contact with the teeth $d^3$ and $d^4$ of the insulated rings $d'$ and $d^2$. Brushes $t'$ and $t^2$, resting against the two rings, are respectively connected with the lines L' and L$^2$.

Direct currents may be derived from the portion B$^2$ of the battery for supplying the field-magnet coils of the generator A'. For this purpose conductors 11 and 12 lead from the respective poles of this section to the binding-post $g'$ $g^2$. The direct-current machine may then be disconnected.

It may not be necessary to employ all the currents derived from the battery B for operating the translating devices; but a portion may be employed for operating the motors E' and E². This may be accomplished by connecting the latter with the sction B² of the battery, the section B' alone being employed for supplying the lines L' and L².

In some instances it may be desired to charge the storage-battery by rectified currents from the alternate-current machine A'. For this purpose a rectifier, A², Fig. 2, may be employed. This may be carried upon the shaft of the generator A' or driven independently at the proper speed. Conductors 1 and 2 lead from the respective brushes a' and a² of the generator to brushes a³ and a⁴, of the rectifier. Collecting-brushes a⁵ and a⁶, applied to the rectifier, lead to the switches S³ and S⁴. The switch-points s³ and s⁴ of these switches are connected by conductors 3 and 4 with the battery B, so that by closing the switches S³ and S⁴ direct electric currents may be delivered to the battery B for charging the same. In some instances it may not be necessary to deliver all the current from the generator A' to the battery B, so that the switches S' and S² may be closed during the time the battery is being charged.

Conductors b' and b² lead from the switches S⁵ and S⁶, connected with the respective poles of the portion B' of the battery B to a rheotome, D, by means of which the current from the portion of the battery may be transformed into alternating, intermittent, or pulsatory currents and delivered to the work-circuit. The rheotome D here shown may be driven by an electric motor, E, or in any other convenient manner. If a motor, E, is employed, this may be driven by the currents derived from a portion of the battery B through conductors e' and e². The rheotome consists of two plates, d' and d², having teeth or plates d³ and d⁴ alternating with each other. The conductors b' and b² are connected with these plates through brushes f' and f², which rest continuously upon the respective plates. The lines L' and L² are connected with brushes p³ and p⁴, which make alternate contact with the two plates through the alternating teeth. In this manner alternating impulses may be transmitted to the lines L' and L² through the battery B when the switches S⁵ and S⁶ are closed, and these currents will be converted into secondary or induced currents by the converters C' and C².

In case the exciter A should at any time become inoperative, then direct currents may be delivered from a portion or the whole of the battery to the field-magnet coils of the generator, as indicated by the conductors 7 and 8, leading to the field-magnet coils through the switches S⁷ and S⁸.

In case pulsatory electric currents are required from the battery, the device shown in Fig. 3 may be employed. In this instance the rheotome D² consists of two plates, d⁷ and d⁸, having teeth d⁹ and d¹⁰ alternating with each other. The brush f' makes alternate contact with the two plates through the teeth. The plate d⁸ is connected with the plate d⁷ through a resistance, R. The line L' is connected with the brush t', and the line L² with the conductor b³. When the rheotome revolves, therefore, the current will flow successively directly through the plate d⁷ and through the plate d⁸ and resistance R, thus producing a pulsatory current.

I claim as my invention—

1. The combination, with a system of electric conversion and distribution, of a source of alternating electric currents, for supplying the same, a source of direct electric currents, a storage battery charged from the last-named source, and a rheotome or current-controller through which the battery may be connected with said system.

2. The combination of a system of electric conversion or distribution by alternating, intermittent, or pulsatory electric currents, an alternate-current electric generator, a direct-current generator for exciting the field-magnets of the same, a storage-battery charged from the last-named generator, and a rheotome or current-reverser, through which currents are delivered from the battery to the system of distribution or conversion.

3. The combination, with a source of alternating, intermittent, or pulsatory electric currents and a direct-current exciter for the same, of a storage-battery charged by currents from said exciter, a system of secondary electric distribution operated by currents from said source, a rheotome through which a portion of said battery may be connected with said system, and means for connecting a portion of the battery through the field-magnet coils of the generator.

In testimony whereof I have hereunto subscribed my name this 5th day of September, A. D. 1887.

HENRY M. BYLLESBY.

Witnesses:
W. D. UPTEGRAFF,
DANL. W. EDGECOMB.